United States Patent [19]

Kapich

[11] Patent Number: 4,500,093
[45] Date of Patent: Feb. 19, 1985

[54] SHAFT SEAL SYSTEM

[75] Inventor: Davorin D. Kapich, Carlsbad, Calif.

[73] Assignee: GA Technologies Inc., San Diego, Calif.

[21] Appl. No.: 412,110

[22] Filed: Aug. 27, 1982

[51] Int. Cl.³ .............................................. F16J 15/56
[52] U.S. Cl. ..................................................... 277/15
[58] Field of Search .................. 277/3, 15, 27, 17, 135

[56] References Cited

U.S. PATENT DOCUMENTS

| | | | |
|---|---|---|---|
| 1,728,268 | 9/1929 | Flanders | 184/621 |
| 2,820,652 | 6/1955 | Oechslin | 286/9 |
| 3,508,758 | 4/1970 | Strub | 277/15 |
| 3,887,197 | 6/1975 | Kapich et al. | 277/15 |
| 4,029,323 | 6/1977 | Inoue et al. | 277/15 |
| 4,193,603 | 3/1980 | Sood | 277/15 |
| 4,247,121 | 1/1981 | Bergman | 277/15 |

*Primary Examiner*—Robert I. Smith
*Attorney, Agent, or Firm*—Fitch, Even, Tabin & Flannery

[57] ABSTRACT

A shaft seal system is disclosed for isolating two regions of different fluid mediums through which a rotatable shaft extends. The seal system includes a seal housing through which the shaft extends and which defines an annular land and an annular labyrinth both of which face on the shaft so that each establishes a corresponding fluid sealing annulus. A collection cavity is formed in communication with the annular sealing spaces, and fluids compatible with the fluids in each of the two regions to be isolated are introduced, respectively, into the annular sealing spaces and collected in the collection cavity from which the fluid mixture is removed and passed to a separator which separates the fluids and returns them to their respective annular sealing spaces in a recycling manner. In the illustrated embodiment, the isolated fluid mediums comprise a liquid region and a gas region. Gas is removed from the gas region and passed through a purifier and a gas pump operative to introduce the purified gas through the labyrinth sealing annulus to the collection cavity. After passing to the separator, the separated gas is passed through a dryer from which the dried gas is caused to pass through the labyrinth sealing annulus into the collection cavity independently of the purified gas so as to insure isolation of the gas region in the event of sealing gas pump malfunction.

5 Claims, 1 Drawing Figure

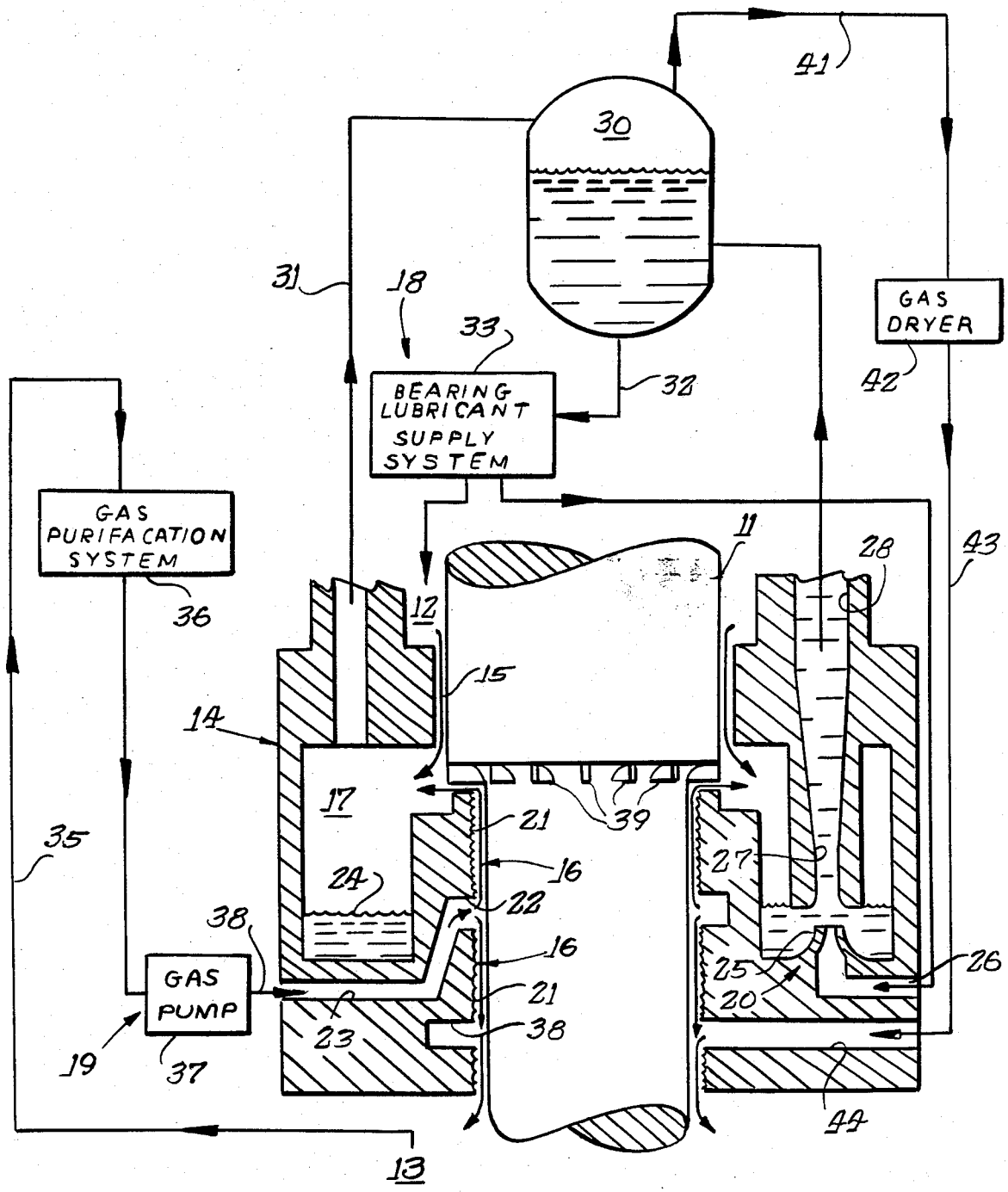

SHAFT SEAL SYSTEM

BACKGROUND OF THE INVENTION

The present invention relates generally to shaft seal systems, and more particularly to a novel seal system for a shaft which extends between two regions containing different fluids which are to be isolated from each other.

In U.S. Pat. No. 3,887,197, a seal system is disclosed which finds application in isolating two regions containing different fluids and between which a rotating shaft extends. As therein set forth, one such application is the isolation of a reactor coolant, such as helium or carbon dioxide, within a fluid circulator chamber in the primary containment vessel of a nuclear reactor wherein the circulator is powered by the shaft of a turbine driven by a fluid, such as steam or water, which must be isolated from the reactor coolant. An example of such a fluid circulator is illustrated and described in U.S. Pat. No. 3,520,640.

In the seal system of U.S. Pat. No. 3,887,197, a seal housing is provided through which a stepped cylindrical rotating shaft extends and which defines an annular land and an annular labyrinth facing on the shaft so that each establishes a fluid sealing annulus or space with the shaft. A collection cavity in the seal housing communicates with both annular sealing spaces so that fluids, such as water and helium gas, compatable with the respective fluid regions to be isolated may be passed through the annular sealing spaces into the collection cavity from which the water and gas fluids are passed to a separator and recycled for sealing purposes. In the disclosed seal system, gas reactor coolant from the circulator is passed through a gas purifier from which the gas is introduced into the labyrinth sealing space by a pressure pump to provide an isolating fluid seal which prevents flow of liquid or liquid moistened gas into the circulator chamber. It will be appreciated that should the pump which pumps sealant gas into the labyrinth sealing annulus malfunction or otherwise become temporarily disabled, liquid moistened gas might enter into the circulator chamber with adverse results.

SUMMARY OF THE INVENTION

One of the primary objects of the present invention is to provide a novel shaft seal system for use in isolating regions of different fluid mediums between which a rotatable shaft extends, such isolation being effected by introducing fluids compatable with respective ones of the fluid mediums into annular sealing spaces about the shaft in a manner to prevent ingress of noncompatible fluid into either region, and which system can operate independently of fluid pressure pumps as employed in prior systems.

A more particular object of the present invention is to provide a novel shaft seal system of the type employed in isolating regions of different fluid mediums between which a rotatable shaft extends and wherein fluids, such as water and purified gaseous helium, compatable with respective ones of the isolated regions are introduced into annular liquid and gas sealing spaces about the shaft and passed to a collection cavity from which the fluids are removed to a separator for recycling, the seal system of the invention including means for removing gas from the separator and passing it through a dryer into the gas sealing annular space in a manner to maintain isolation of the corresponding region independently of the primary gas purification supply.

Further objects and advantages of the present invention, together with its organization and manner of operation, will become apparent from the following description of the invention when taken in connection with the accompaying drawing.

BRIEF DESCRIPTION OF THE DRAWING

The sole FIGURE is a combined fragmentary longitudinal sectional view and schematic representation of a shaft seal system constructed in accordance with the invention.

DETAILED DESCRIPTION OF PREFERRED EMBODIMENT

Very generally, the seal system of the invention is for a shaft 11 which extends between a first region 12 in which a first fluid is present and a second region 13 in which a second fluid is present. The seal includes a seal housing 14 defining an annular land 15 and an annular labyrinth 16, both of which face the shaft. The land 15 is spaced axially toward the first region from labyrinth 16. The seal housing further defines a fluid collection cavity 17 communicating with the annular space between the land and the shaft and with the annular space between the labyrinth and the shaft. Means 18 are provided for introducing a fluid compatible with the first fluid into the annular space between the land and the shaft. Means 19 are provided for introducing a fluid compatible with the second fluid into the annular space between the labyrinth and the shaft, and means 20 are provided for removing fluids from the collection cavity 17.

More particularly, the shaft 11 comprises a stepped cylindrical drive shaft of a helium circulator for use in a gas cooled nuclear reactor in which the primary coolant is helium. The helium coolant gas is present in the region 13 and the shaft 11 drives a suitable helium circulator, not shown, in the region 13 for circulating the coolant.

The shaft 11 is driven by a steam turbine, not shown, and is supported by high pressure water lubricated bearings, not shown, in the region 12 in a known manner. The water bearings also isolate region 12 from the steam in a steam turbine. Thus, water is present in the region 12. The shaft 11 and seal housing 14 may be suitably enclosed in a circulator housing, not shown, positioned within the primary enclosure, not shown, of the nuclear reactor. The annular land 15 provides a rotary seal between region 12 and the collection cavity 17.

The seal housing 14 encircles shaft 11 between the regions 12 and 13 and has land 15 formed therein of a diameter to establish a narrow annular region or space between the land and the shaft of sufficient size to maintain a fluid barrier when fluid is introduced thereto under sufficient pressure. This fluid barrier exists both when shaft 11 is rotating and when it is stationary. Thus water introduced into the annulus between land 15 and shaft 11 under sufficient pressure provides the necessary fluid barrier.

The stepped shaft 11 is of reduced diameter within the annular labyrinth 16 which is formed in accordance with known techniques to provide a plurality of contiguous annular grooves 21 extending along the shaft closely adjacent the surface of the shaft so as to restrict passage of fluids through the labyrinth space.

An annular recess 22 is formed within the housing 14 intermediate the ends of the labyrinth 16. A fluid injection passage 23 is formed within housing 14 in communicating relation with the annular recess 22 and is adapted to enable a fluid compatible with the fluid in region 13 to be introduced under pressure to recess 22. This fluid flows into the annular recess 22 and in opposite directions longitudinally along the labyrinth 16 as shown by the arrows. In the case of a helium cooled nuclear reactor, the fluid introduced into passage 23 is helium, and thus the fluid entering the region 13 through the labyrinth 16 is fully compatible with the coolant present in the circulator region.

The collection cavity 17 is formed as an annular cavity within housing 14 so as to extend around shaft 11 and open onto the shaft in the region between land 15 and labyrinth 16. In this manner, fluid introduced into the annular sealing spaces defined, respectively, between the shaft 11 and the land 15 and between the shaft and labyrinth 16 flow axially along the shaft toward each other and then flow into the collection cavity 17. In the described embodiment, a mixture of water and helium is present in the collection cavity 17. The level of water in cavity 17 during normal operation of the seal system is indicated at 24, and is maintained at this predetermined level by the action of a jet pump in the form of a nozzle 25 and passages 27 and 28 which form removal means.

More particularly, the nozzle 25 and passages 27 and 28 comprise a jet pump designed to pump a much larger quantity of water than that passing into cavity 17 via passage 15. Therefore, as soon as the water level 24 reaches or overflows slightly the inlet opening of the passage 27 the water is extracted out of the cavity 17 at a faster rate then the rate of leakage into the passage 15. As soon as the water level 24 drops below the inlet opening of passage or orifice 27, the helium gas and water mixture is pumped by the jet pump. This action causes the water level 24 to stay at a more or less constant level determined by the vertical location of the entry opening of passage 27. The helium gas which flows into cavity 17 via the labyrinth passage 21 is pumped by the jet pump (25, 27, 28) at a rate which may be lower or higher than the rate of flow through the labyrinth passage 21. In case of a jet pump pumping at a higher rate than the rate of flow into collection cavity 17, a pressure equalization line 31 allows the excess of helium flow pumped by the jet pump to flow from the separator 30 back to the cavity 17. If the jet pump pumps less flow than that flowing through labyrinth 21, any excess helium flows via a line 31 into a conventional separator 30.

The nozzle 25 of the jet pump is formed in the housing 14 so as to project upwardly into the cavity 17 and terminate below the normal level 24 of liquid therein. A passage 26 communicates with nozzle 25 from outside the seal housing 14. The passage 27 defines a mixing throat which extends downwardly into the collection cavity 17 in vertical alignment with nozzle 25. The lower terminus of throat 27 is formed so as to lie at approximately the desired level 24 of fluid within the collection cavity. The interior of the mixing throat 27 is shaped so as to terminate in a widened diffuser region 28. The nozzle 25 and mixing throat 27 together constitute the means 20 for removing fluid from the cavity 17, as will be explained.

The diffuser 28 is connected through a suitable conduit 29 to the separator system 30. The pressure equalizing line 31 connects the collection cavity 17 with the upper portion of the separator 30. The separator 30 operates in a known manner to separate the helium gas from the water in which it is entrained, and a conduit 32 is operative to pass the liquid water back to a bearing lubricant system 33. The system 33 is of known design and supplies water under pressure to the bearings, not shown, for the shaft 11, and to the annular sealing space or annulus between the land 15 and shaft 11. The bearing lubricant system 33 thus defines the means 18 for introducing fluid into the sealing annulus between land 15 and the shaft 11.

Since a portion of the fluid introduced into the annular labyrinth passage 16 flows downwardly into the circulator cavity 13 of the reactor, it is desirable that the fluid introduced into the annular chamber 22 through the passage 23 be of a purification compatible with the fluid coolant, such as helium, within the circulator chamber or region 13. In the illustrated embodiment, compatibility of the fluid gas introduced into the labyrinth seal space 16 is assured by withdrawal of coolant gas from the circulator cavity or region 13 and passage of the withdrawn gas through a conduit 35 to a gas purification system 36 of known design from which the purified gas is passed to a gas pump 37 operative to introduce the gas under pressure into the passage 23 through a conduit 38.

The shaft seal system thus far described is generally similar to the seal system disclosed in the aforementioned U.S. Pat. No. 3,887,197, which is incorporated herein by reference. The seal system disclosed in U.S. Pat. No. 3,887,197 differs from the shaft seal system in accordance with the present invention as thus far described by providing for the passage of gas from the separator 30 to a gas dryer after intermixing or combining the gas from the separator with coolant gas withdrawn from the circulator region 13.

During normal operation of both the shaft seal system thus far described and the seal system described in the U.S. Pat. No. 3,887,197, purified buffer gas, namely helium, is introduced under pressure into the passage 23 and into the annular recess 22 whereupon a portion of the buffer or sealing gas flows upwardly along the upper portion of the labyrinth 16 into the collection cavity 17. Liquid lubricant, such as water, flowing downwardly through the liquid seal established between the land 15 and shaft 11 also flows into the collection cavity 17 where it mixes with the buffer gas. By stepping the diameter of the shaft 11 just above the labyrinth 16, direct fluid impingement on the labyrinth space 16 from the liquid introduced into the annular space between land 15 and shaft 11 is prevented. A plurality of radial veins 39 are formed about the shaft 11 at its stepped diameter so as to form a centrifugal seal on the shaft which prevents downward liquid flow through the labyrinth 16 in the event the collection cavity 17 becomes totally filled with liquid.

Under normal operating conditions, the fluid lubricant passing downwardly through the annular sealing space defined by the land 15, and the gas passing upwardly into the collection chamber 17 through the labyrinth seal 16 are scavaged from the collection cavity to the separator tank 30 by means of the aforedescribed jet pump 20 which controls the liquid surface level 24 in the collection cavity. With the seal system as thus described, the operating efficiency of the sealing system is to a significant extent dependent upon the gas purification system 36 and the gas pump 37. Should the gas pump malfunction or otherwise become temporarily inoperative, a possibility arises wherein the dry sealing gas passing upwardly through the labyrinth 16 to the collection chamber 17 ceases and thus fails to prevent the flow of moistened gas from the collection cavity 17 downwardly into the circulator cavity 13. In accordance with one feature of the present invention, this possibility is prevented by providing means for passing dry fluid gas directly from the separator 30 back to the annular labyrinth 16 such that dry gas continues to flow upwardly through the labyrinth space 16 into the collection cavity and thereby prevents ingress of moistened gas into the circulator chamber in the event pump 34 becomes inoperative.

In carrying out the present invention, the fluid gas entering the collection cavity 17 from the annular labyrinth seal 16 is conveyed to the separator tank 30 through the lines 29 and 31 as aforedescribed. Because the separator tank is of fixed captive volume, gas from the separator is forced out of the separator tank through a conduit 41 and passed through a gas dryer 42 of conventional design. From gas dryer 42 the dried gas is passed through a suitable conduit 43 into a passage 44 which is formed in the seal housing 14 and communicates with an annular chamber 45 formed in the seal housing peripherally of the reduced diameter portion of shaft 11 and intermediate the ends of the labyrinth 16, preferably between the annular chamber 22 and the lower end of the labyrinth. Gas flow from the chamber 45 is normally combined with gas flowing downwardly in labyrinth 16 from chamber 22 and is discharged into cavity 13.

During rotation of shaft 11, the radial vanes 39 produce a pumping action which normally compliments the pumping action of gas pump 34. The pumping action of vanes 39 is sufficient to continue drawing dry gas from the annular chamber 45 and draw it upwardly through the labyrinth 16 for discharge into the collection cavity 17 in the event the gas pump 34 becomes inoperative or otherwise ceases its pumping action. The pressure rise caused by the vanes 39 forces the gas discharged into the collection cavity 17 from the annular labyrinth 16 and annular chamber 45 to flow to the separator tank 30 through line 31 and the jet pump 20 and conduit 29. Thus, should the gas pump 37 cease operation so that sealing gas is not introduced into the annular chamber 22, the entire gas flow recirculated into annular chamber 45 will pass upwardly through the labyrinth seal area 16 to the collection cavity 17 and thereby assure the prevention of wet gas flow from the collection cavity downwardly toward the circulator cavity 13. In this manner, the present invention provides a shaft seal system whch employs kpassive means, e.g. the shaft mounted vanes 39, to insure continued isolation of the circulator cavity 13 from moisture ingress in the event operation of the primary sealing gas pump is interrupted, and thus is less dependent on the gas purification system supply than prior seal systems.

A significant advantage of the shaft seal system in accordance with the present invention is that ingress of moisture into the circulator cavity 13 will not take place even though the circulator cavity may undergo depressurization. More particularly, during depressurizing of the circulator cavity 13, the pressure in the separator tank 30 is equalized with the pressure in the circulator cavity via line 41, gas dryer 42, passage 44 and the annular space between shaft 11 and the lower end of labyrinth 16. Any moisture in the gas from the separator is removed in the dryer 42.

While a preferred embodiment of the present invention has been illustrated and described, it will be understood to those skilled in the art that changes and modifications may be made therein without departing from the invention and its broader aspects. Various features of the invention are defined in the following claims.

What is claimed is:

1. In a shaft seal system for isolating two regions of different fluid mediums between which a shaft extends, said system including a seal housing defining an annular land and an annular labyrinth facing the shaft, said land being spaced axially toward a selected one of said regions from said labyrinth, said seal housing further defining a fluid collection cavity for communicating with the space between said land and the shaft and the space between said labyrinth and the shaft, first means for introducing a first fluid compatible with the fluid in said selected one of said regions into the space between said land and the shaft in a manner to form a fluid seal therein and effect entry of said first fluid into said collection cavity, second means including gas purification means and gas pumping means for introducing a second gaseous fluid compatible with the fluid in the other of said regions into the space between said labyrinth and the shaft in a manner to normally form a fluid seal therein and effect entry of said second fluid into said collection cavity and prevent ingress of said first fluid into said other region through said space between said labyrinth and the shaft, means for removing fluids from said collection cavity,
    a fixed captive volume separator adapted to receive a mixture of the first and second fluids from said means for removing fluids from said collection cavity and to separate the fluids from each other,
    a dryer connected to said separator for drying the second gaseous fluid,
    means for introducing the dry second gaseous fluid from said gas dryer into the space between said labyrinth and said shaft, and
    passive pumping means associated with said shaft for effecting passage of said dried gaseous fluid from said means for introducing the dry second gaseous fluid into said space between said labyrinth and said shaft in a manner to prevent ingress of said first fluid into said other region in the event said gas pumping means becomes disabled.

2. A shaft seal system according to claim 1 wherein said second introduction means is operative to introduce said second fluid at a region intermediate the ends of said labyrinth.

3. A shaft seal system as defined in claim 1 wherein said passive means comprise a plurality of vanes mounted on said shaft in circumferential spaced relation therearound.

4. A shaft seal system according to claim 1 wherein said first fluid is identical with the fluid in said selected one of said regions, said second fluid being substantially identical with the fluid in the other of said regions.

5. A shaft seal system as defined in claim 1 wherein said means for removing said second fluid from said fluid receiving means and introducing said removed fluid into said space between said labyrinth and said shaft is operative to introduce said removed fluid intermediate the ends of said labyrinth.

* * * * *

UNITED STATES PATENT AND TRADEMARK OFFICE
CERTIFICATE OF CORRECTION

PATENT NO. :     4,500,093

DATED      :     February 19, 1985

INVENTOR(S) :    Davorin D. Kapich

It is certified that error appears in the above-identified patent and that said Letters Patent is hereby corrected as shown below:

The Assignee should read:     United States of America, as represented by the Department of Energy, Washington, D.C.

UNITED STATES PATENT AND TRADEMARK OFFICE
CERTIFICATE OF CORRECTION

PATENT NO. : 4,500,093

DATED : February 19, 1985

INVENTOR(S) : DAVORIN D. KAPICH

It is certified that error appears in the above-identified patent and that said Letters Patent is hereby corrected as shown below:

In the Specification

Column 1, line 5, insert the following paragraph after the words "Background Of The Invention". --The government has rights in this invention pursuant to Contract No. DE-AT03-76SF70046 awarded by the United States Department of Energy.--

Column 1, line 51 change "compatable" to --compatible--.

Column 2, line 7 change "accompaying" to --accompanying--.

Signed and Sealed this

Fifteenth Day of October 1985

[SEAL]

Attest:

DONALD J. QUIGG

Attesting Officer

Commissioner of Patents and Trademarks—Designate